(12) United States Patent
Ulrey et al.

(10) Patent No.: US 9,920,679 B2
(45) Date of Patent: Mar. 20, 2018

(54) METHOD AND SYSTEM FOR REDUCING PARTICULATE EMISSIONS

(71) Applicant: Ford Global Technologies, LLC, Dearborn, MI (US)

(72) Inventors: Joseph Norman Ulrey, Dearborn, MI (US); Paul M. Laing, Canton, MI (US); Michael James Uhrich, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/041,689

(22) Filed: Feb. 11, 2016

(65) Prior Publication Data

US 2017/0234196 A1 Aug. 17, 2017

(51) Int. Cl.
| | | |
|---|---|---|
| F01N 3/00 | (2006.01) | |
| F01N 9/00 | (2006.01) | |
| F01N 3/023 | (2006.01) | |
| F01N 13/14 | (2010.01) | |
| F01N 3/027 | (2006.01) | |

(52) U.S. Cl.
CPC ............. *F01N 9/002* (2013.01); *F01N 3/023* (2013.01); *F01N 3/027* (2013.01); *F01N 3/0238* (2013.01); *F01N 13/14* (2013.01); *F01N 2410/04* (2013.01); *Y02T 10/47* (2013.01)

(58) Field of Classification Search
CPC .......... F01N 3/023; F01N 9/002; F01N 13/14; F01N 3/0238
USPC .......................................................... 60/274
See application file for complete search history.

(56) References Cited

U.S. PATENT DOCUMENTS

| | | | |
|---|---|---|---|
| 5,488,826 A | 2/1996 | Paas | |
| 6,770,116 B2 * | 8/2004 | Kojima ................... | F01N 3/023 369/273 |
| 8,327,628 B2 | 12/2012 | Ruona et al. | |
| 8,424,295 B2 | 4/2013 | Bidner et al. | |
| 8,789,360 B2 | 7/2014 | Boshart | |
| 2003/0066287 A1 * | 4/2003 | Hirota ................ | B01D 53/9431 60/297 |
| 2004/0226287 A1 | 11/2004 | Edgar et al. | |
| 2006/0260297 A1 * | 11/2006 | Koch .................... | F01N 3/0807 60/286 |
| 2008/0066451 A1 | 3/2008 | Warner et al. | |

(Continued)

FOREIGN PATENT DOCUMENTS

EP      1157197 B1    4/2003

*Primary Examiner* — Jason Shanske
(74) *Attorney, Agent, or Firm* — Julia Voutyras; McCoy Russell LLP (57) ABSTRACT

Methods and systems are provided for filtering particulate matter in an exhaust passage of an engine system. In one example, a method may include during a cold start condition comprising an engine temperature being less than a threshold engine temperature, directing engine exhaust gas to an exhaust particulate filter, and during a warm engine condition, directing engine exhaust gas to bypass the exhaust particulate filter, wherein the warm engine condition comprises the engine temperature being greater than or equal to the threshold engine temperature and fuel being combusted in the engine. In this way, the exhaust particulate filter may be reliably regenerated during engine shutdown events such as DFSOs while reducing filter degradation, and lowering PM emissions.

8 Claims, 5 Drawing Sheets

(56) References Cited

U.S. PATENT DOCUMENTS

| | | | |
|---|---|---|---|
| 2009/0013674 A1* | 1/2009 | Ono | B01D 53/9431 60/311 |
| 2010/0126144 A1* | 5/2010 | He | F01N 3/0253 60/286 |
| 2010/0126145 A1* | 5/2010 | He | F01N 9/002 60/286 |
| 2011/0005205 A1* | 1/2011 | Lee | B01D 46/0063 60/277 |
| 2012/0060482 A1 | 3/2012 | Gonze et al. | |
| 2012/0124977 A1 | 5/2012 | Choe | |
| 2015/0158023 A1 | 6/2015 | Rajaram et al. | |

\* cited by examiner

METHOD AND SYSTEM FOR REDUCING PARTICULATE EMISSIONS

FIELD

The present description relates generally to the design and use of an engine exhaust system for reducing particulate emissions from a combustion engine.

BACKGROUND/SUMMARY

Engine combustion using diesel or gasoline fuel may generate particulate matter (PM) (such as soot and aerosols) that can be exhausted to the atmosphere. To enable emissions compliance, particulate filters such as diesel particulate filters (DPFs) and gasoline particulate filters (GPFs) may be included inline in the engine exhaust stream, to filter out exhaust PMs before releasing the exhaust. Particulate filters that become clogged with PM may be regenerated in-situ during deceleration fuel shut off (DFSO) events by supplying excess oxygen to the filter and raising the filter temperature to oxidize the PM. One example approach shown by Bidner et. al. in U.S. Pat. No. 8,424,295 discloses increasing excess oxygen to the particulate filter during engine shutdown conditions and regenerating the particulate filter at least during a portion of the engine shutdown.

However, the inventors herein have recognized potential disadvantages with the above approach. Oxygen flow to the filter during DFSO or other engine shutdown events may increase the filter temperature excessively leading to premature filter degradation. Furthermore, employing strategies to limit DFSO duration to mitigate excessive exhaust particulate filter temperature increases and premature filter degradation can reduce fuel economy, and may also reduce drivability. Further still during short engine on periods (e.g., during short vehicle trips), the particulate filter temperature may fail to reach a high enough temperature for regeneration.

The inventors herein have identified an approach that at least partly addresses the above issues. In one example, a method for a combustion engine may comprise: during a cold start condition comprising an engine temperature being less than a threshold engine temperature, directing engine exhaust gas to an exhaust particulate filter; and during a warm engine condition, directing engine exhaust gas to bypass the exhaust particulate filter, wherein the warm engine condition comprises the engine temperature being greater than or equal to the threshold engine temperature and fuel being combusted in the engine.

In another example, a method may comprise: in response to an engine temperature being greater than a threshold engine temperature, directing exhaust gas to bypass an exhaust particulate filter during engine fuel combustion, and heating the exhaust particulate filter when an exhaust particulate filter temperature decreases below a threshold filter temperature; and in response to an engine temperature being less than a threshold engine temperature, directing exhaust gas to the exhaust particulate filter and ceasing to heat the exhaust particulate filter.

In a further example, an engine system may comprise: an engine; an exhaust particulate filter positioned in an exhaust bypass passage downstream of the engine; an exhaust diverter valve positioned upstream of the exhaust bypass passage; and a controller, including executable instructions to, during a first condition comprising an engine temperature being less than a threshold engine temperature, positioning the exhaust diverter valve to direct engine exhaust gas to the exhaust bypass passage and the exhaust particulate filter; and during a second condition, positioning the exhaust diverter valve to direct engine exhaust gas to bypass the exhaust bypass passage, wherein the second condition comprises the engine temperature being greater than or equal to the threshold engine temperature and fuel being combusted in the engine.

In this way, the technical effect may be achieved that the exhaust particulate filter may be reliably regenerated during engine shutdown events such as DFSOs without premature degradation. Furthermore, by avoiding any limiting of the engine shutdown events, drivability and fuel economy are maintained. Further still, by diverting the exhaust stream to the exhaust particulate filter during engine cold start conditions and bypassing the exhaust particulate filter during warm engine combustion conditions, the exhaust particulate filter size may be reduced thereby lowering manufacturing costs and improving reliability while maintaining vehicle PM emissions. Further still, by heating the exhaust particulate filter during warm engine conditions and during engine fuel combustion, the exhaust particulate filter temperature can be preheated to a temperature high enough for filter regeneration.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
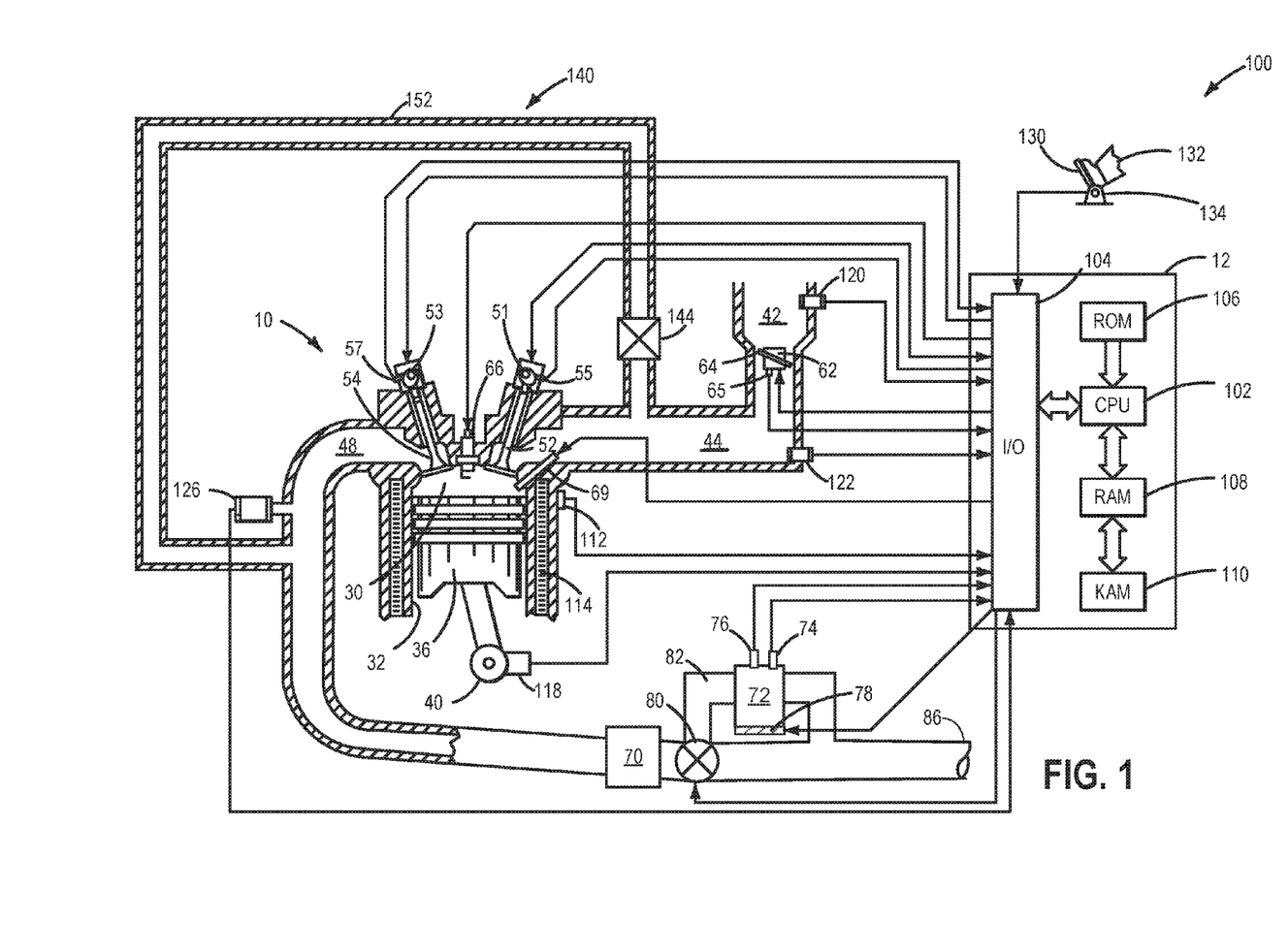
FIG. 1 shows an example engine system including an exhaust particulate filter positioned downstream of an emissions control device.
Figure 3:
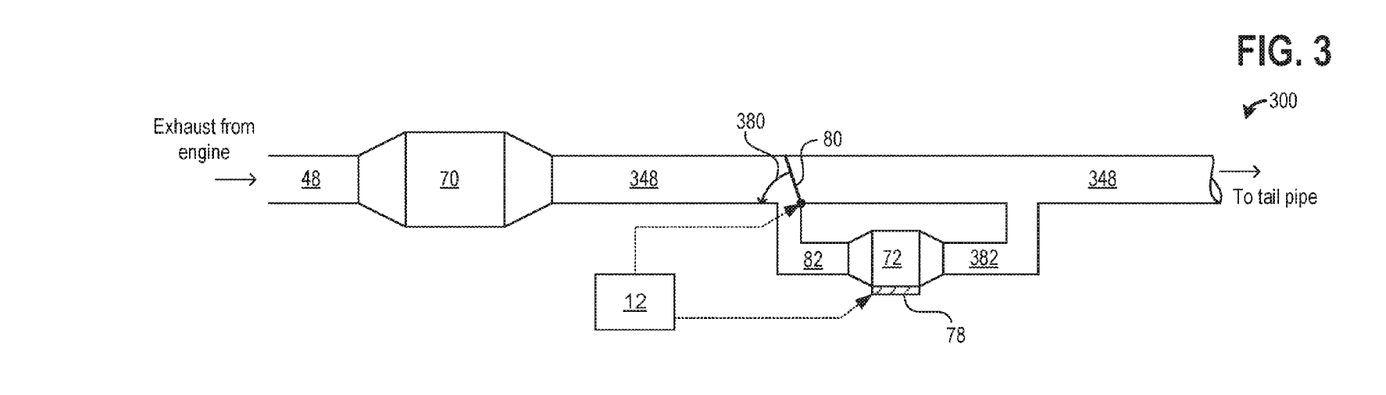
FIGS. 3 and 4 show example exhaust systems of the engine system of FIG. 1, including an exhaust diverter valve and an exhaust particulate filter.
Figure 4:
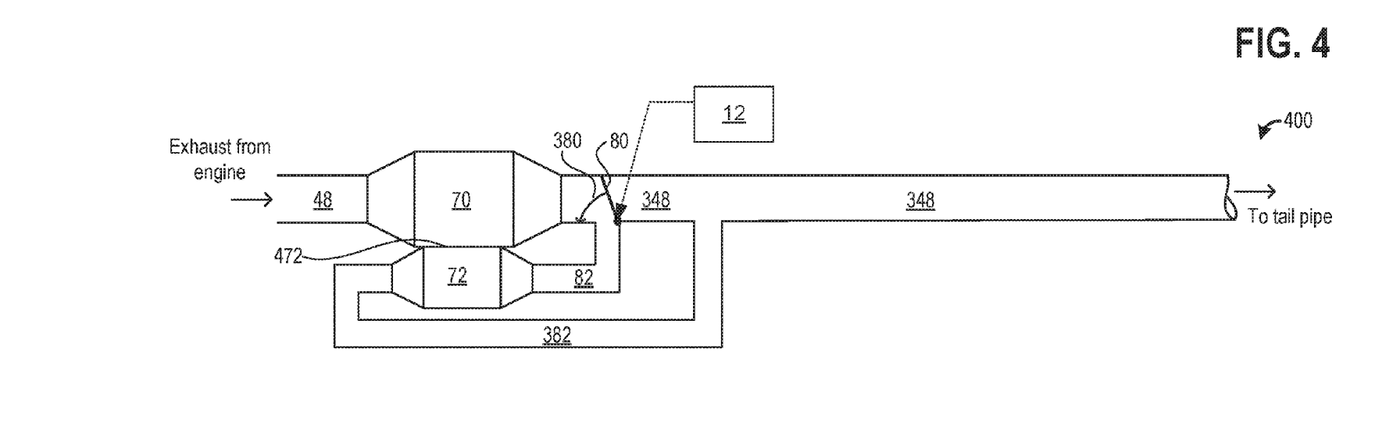
Figure 5:
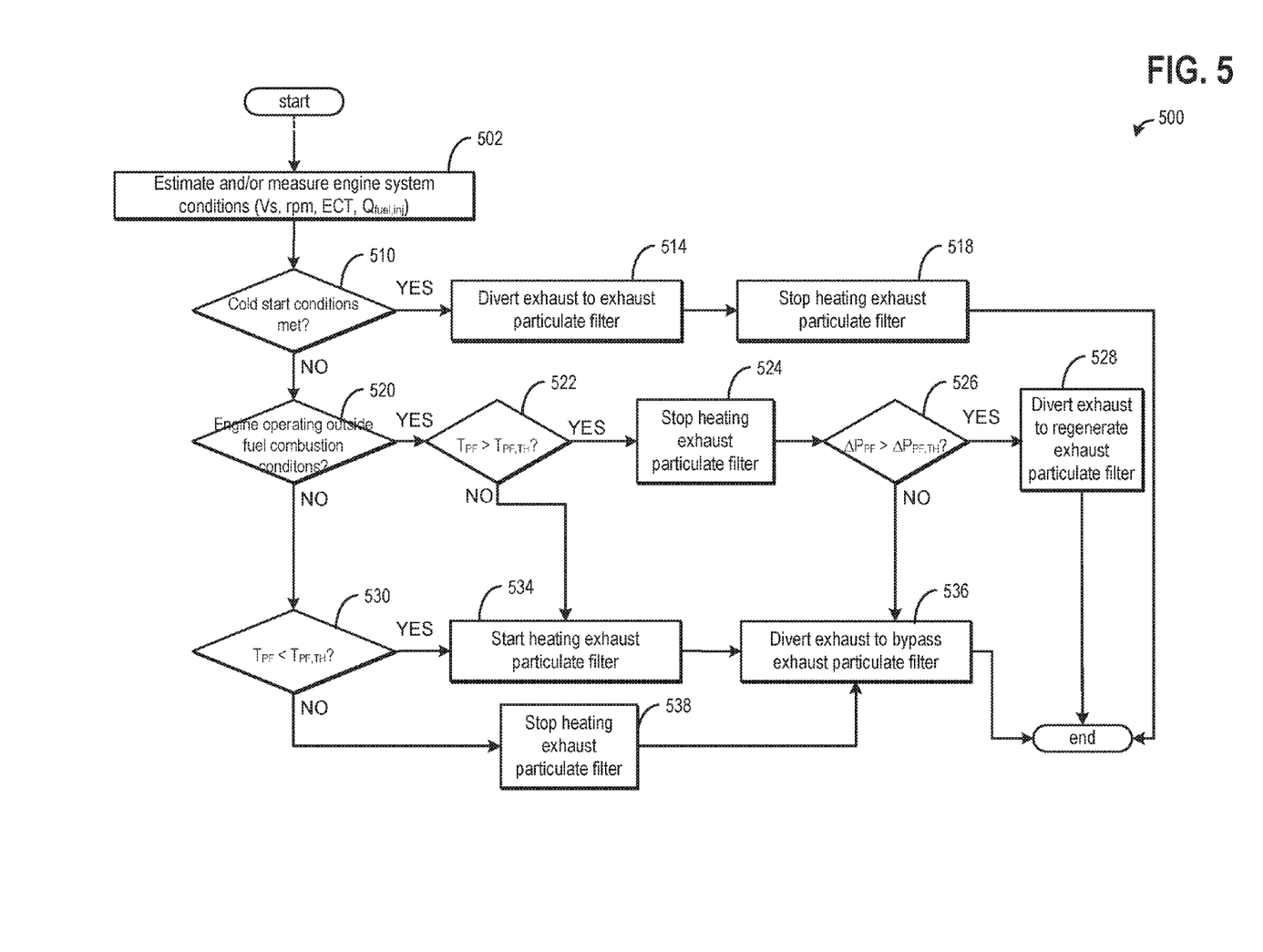
FIG. 5 shows a flow chart for an example method of operating an engine system, including an exhaust diverter valve and an exhaust particulate filter.
Figure 6:
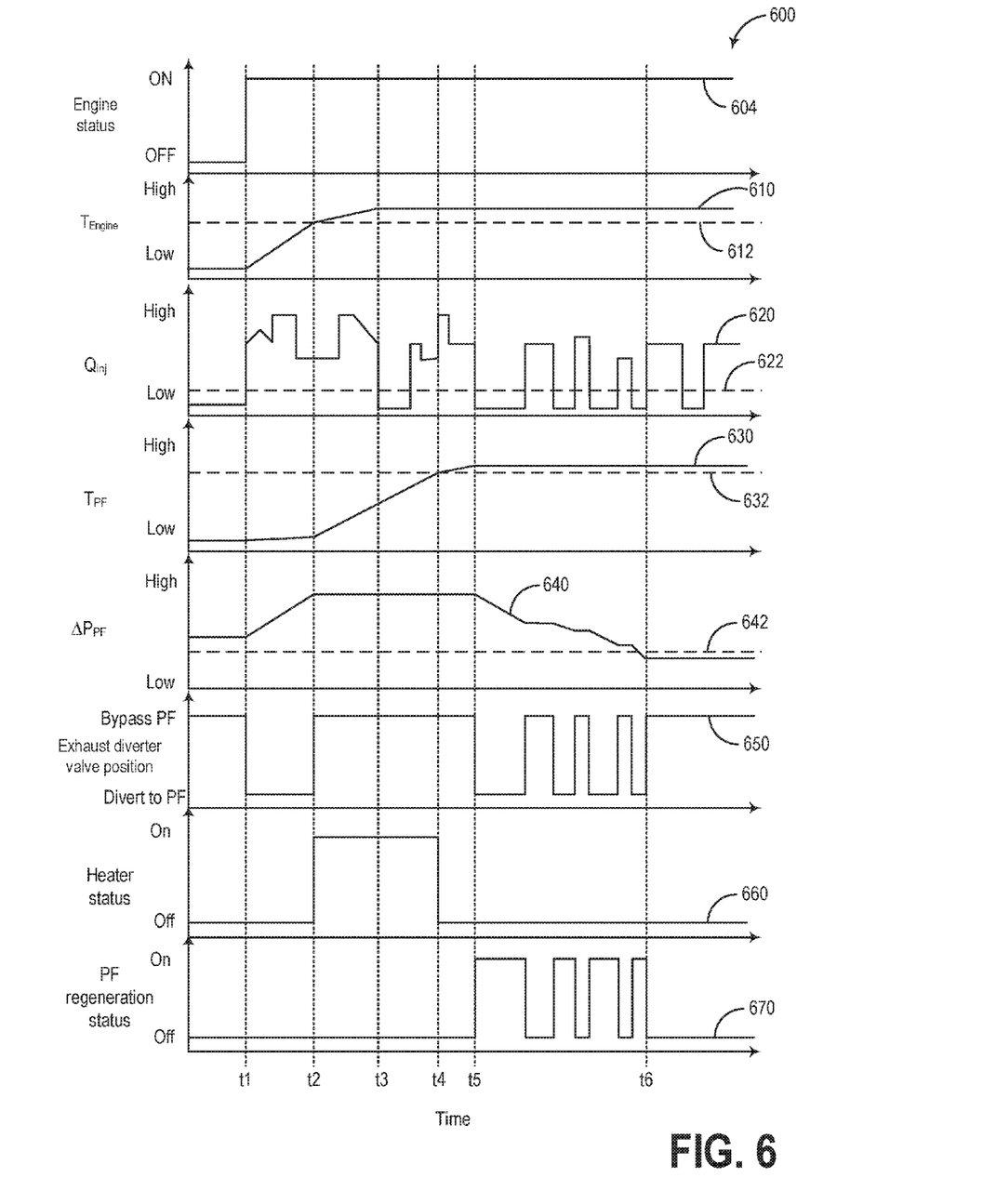
FIG. 6 shows an example timeline illustrating operation of an engine system, including an exhaust diverter valve and an exhaust particulate filter.

The following description relates to systems and methods for reducing particulate emissions from an engine system including an exhaust diverter valve and an exhaust particulate filter. A vehicle engine system, including an exhaust particulate filter, may be configured to operate with fuels such as diesel or gasoline is shown in FIG. 1. The exhaust particulate filter may include a diesel particulate filter (DPF), a gasoline particulate filter (GPF), and the like, to filter particulate matter (PM) in the engine exhaust. The exhaust particulate filter may capture PM during vehicle driving, as illustrated by the plot in FIG. 2. As shown in FIGS. 3-4, the exhaust may be directed to an exhaust particulate filter disposed in a bypass exhaust passage via an exhaust diverter valve in the main exhaust passage. A method for operating the engine system, including the exhaust diverter valve for directing exhaust to the exhaust particulate filter is shown in FIG. 5. FIG. 6 illustrates an example timeline for operating an engine system via the method of FIG. 5. In this way, vehicle emissions may be reduced while maintaining fuel economy, vehicle drivability, and engine system reliability.

FIG. 1 is a schematic diagram showing one cylinder of a multi-cylinder engine 10 in an engine system 100, which may be included in a propulsion system of a vehicle. The engine 10 may be controlled at least partially by a control system including a controller 12 and by input from a vehicle operator 132 via an input device 130. In this example, the input device 130 includes an accelerator pedal and a pedal position sensor 134 for generating a proportional pedal position signal. A combustion chamber 30 of the engine 10 includes a cylinder formed by cylinder walls 32 with a piston 36 positioned therein. The piston 36 may be coupled to a crankshaft 40 so that reciprocating motion of the piston is translated into rotational motion of the crankshaft. The crankshaft 40 may be coupled to at least one drive wheel of a vehicle via an intermediate transmission system. Further, a starter motor may be coupled to the crankshaft 40 via a flywheel to enable a starting operation of the engine 10.

The combustion chamber 30 may receive intake air from an intake manifold 44 via an intake passage 42 and may exhaust combustion gases via an exhaust passage (e.g., exhaust pipe) 48. The intake manifold 44 and the exhaust passage 48 (e.g., exhaust main passage) can selectively communicate with the combustion chamber 30 via respective intake valve 52 and exhaust valve 54. In some examples, the combustion chamber 30 may include two or more intake valves and/or two or more exhaust valves.

In this example, the intake valve 52 and exhaust valve 54 may be controlled by cam actuation via respective cam actuation systems 51 and 53. The cam actuation systems 51 and 53 may each include one or more cams and may utilize one or more of cam profile switching (CPS), variable cam timing (VCT), variable valve timing (VVT), and/or variable valve lift (VVL) systems that may be operated by the controller 12 to vary valve operation. The position of the intake valve 52 and exhaust valve 54 may be determined by position sensors 55 and 57, respectively. In alternative examples, the intake valve 52 and/or exhaust valve 54 may be controlled by electric valve actuation. For example, the cylinder 30 may alternatively include an intake valve controlled via electric valve actuation and an exhaust valve controlled via cam actuation including CPS and/or VCT systems.

A fuel injector 69 is shown coupled directly to combustion chamber 30 for injecting fuel directly therein in proportion to the pulse width of a signal received from the controller 12. In this manner, the fuel injector 69 provides what is known as direct injection of fuel into the combustion chamber 30. The fuel injector may be mounted in the side of the combustion chamber (as shown) or in the top of the combustion chamber, for example. Fuel may be delivered to the fuel injector 69 by a fuel system (not shown) including a fuel tank, one or more fuel pumps, and a fuel rail. In some examples, the combustion chamber 30 may alternatively or additionally include a fuel injector arranged in the intake manifold 44 in a configuration that provides what is known as port injection of fuel into the intake port upstream of the combustion chamber 30. Fuel injection flow rates may be estimated and/or measured by the fuel pump rates to the fuel injectors. The fuel may comprise gasoline, diesel, ethanol blends, biodiesel, and a combination thereof.

Spark is provided to combustion chamber 30 via spark plug 66. The ignition system may further comprise an ignition coil (not shown) for increasing voltage supplied to spark plug 66. In other examples, such as a diesel engine, spark plug 66 may be omitted.

The intake passage 42 may include a throttle 62 having a throttle plate 64. In this particular example, the position of throttle plate 64 may be varied by the controller 12 via a signal provided to an electric motor or actuator included with the throttle 62, a configuration that is commonly referred to as electronic throttle control (ETC). In this manner, the throttle 62 may be operated to vary the intake air provided to the combustion chamber 30 among other engine cylinders. The position of the throttle plate 64 may be provided to the controller 12 by a throttle position signal. The intake passage 42 may include a mass air flow sensor 120 and a manifold air pressure sensor 122 for sensing an amount of air entering engine 10.

An exhaust gas sensor 126 is shown coupled to the exhaust passage 48 upstream of both an exhaust gas recirculation system 140 and an emission control device 70 according to a direction of exhaust flow. The sensor 126 may be any suitable sensor for providing an indication of exhaust gas air-fuel ratio such as a linear oxygen sensor or UEGO (universal or wide-range exhaust gas oxygen), a two-state oxygen sensor or EGO, a HEGO (heated EGO), a $NO_x$, HC, or CO sensor. In one example, upstream exhaust gas sensor 126 is UEGO configured to provide output, such as a voltage signal, that is proportional to the amount of oxygen present in the exhaust. Controller 12 converts oxygen sensor output into exhaust gas air-fuel ratio via an oxygen sensor transfer function.

An exhaust gas recirculation (EGR) system 140 may route a desired portion of exhaust gas from the exhaust passage 48 to the intake manifold 44 via an EGR passage 152. The amount of EGR provided to the intake manifold 44 may be varied by the controller 12 via an EGR valve 144. Under some conditions, the EGR system 140 may be used to regulate the temperature of the air-fuel mixture within the combustion chamber, thus providing a method of controlling the timing of ignition during some combustion modes.

The emission control device 70 is shown arranged along the exhaust passage 48 downstream of the exhaust gas sensor 126. The emission control device 70 may be a three way catalyst (TWC), $NO_x$ trap, various other emission control devices, or combinations thereof. In some examples, during operation of the engine 10, the emission control device 70 may be periodically reset by operating at least one cylinder of the engine within a particular air-fuel ratio.

A particulate filter 72 is shown arranged along an exhaust bypass passage 82 off of the exhaust passage 48 downstream of the emission control device 70. As shown in FIG. 1, an exhaust diverter valve 80 may be positioned in the main exhaust passage 48 at the inlet junction of the exhaust bypass passage 82. As such, the exhaust diverter valve 80 may be positioned, either to divert exhaust gas from the main exhaust passage 48 to the exhaust bypass passage 82 and the exhaust particulate filter 72, or to bypass the exhaust bypass passage 82 and the exhaust particulate filter 72. Controller 12 may control actuation of the exhaust diverter valve 80. Although not shown in FIG. 1, a check valve may be positioned downstream of the exhaust particulate filter 72 within the exhaust bypass passage 82 to prevent flow of exhaust gases downstream from the exhaust particulate filter 72 in the main exhaust passage 48 back to the exhaust bypass passage 82. A particulate filter temperature sensor 76 may also be positioned at or in the vicinity of exhaust particulate filter 72 to estimate the particulate filter temperature. Furthermore, a particulate filter heater 78 may be thermally coupled to the exhaust particulate filter 72. Particulate filter heater may be controlled by controller 12 for preheating the particulate filter 72 prior to regeneration of the particulate filter.

The exhaust gas treated by emission control device 70 and particulate filter 72 is released into the atmosphere through tailpipe 86. The particulate filter 72 may be a diesel particulate filter, a gasoline particulate filter, and the like. A substrate of the particulate filter 72 may be made of ceramic, silicon, metal, paper, or combinations thereof. During operation of the engine 10, particulate filter 72 may capture exhaust particulate matter (PMs), such as ash and soot (e.g., from unburned hydrocarbons) in order to reduce vehicle emissions. The soot may clog the surfaces of the particulate filter thereby creating an exhaust backpressure. The exhaust backpressure may negatively influence the engine performance. Once the particulate filter 72 becomes fully loaded with soot (e.g., soot load on the particulate filter exceeds a soot load threshold), the backpressure may be too high for proper exhaust expulsion. Work used to expel exhaust from the engine 10 increases in order to overcome the backpressure described above. In order to avoid high backpressure, an engine 10 may periodically regenerate the filter either passively or actively.

The pressure drop across the filter may measured by one or more pressure sensors 74 located at or in the vicinity of the particulate filter 72. As an example, the one or more pressure sensors may be positioned immediately upstream and immediately downstream from the particulate filter 72 within exhaust bypass passage 82. In other examples, the one or more pressure sensors may be positioned at other locations within the main exhaust passage 48 or exhaust bypass passage 82. As an example, the particulate filter may be regenerated in response to a pressure drop across the particulate filter 72 increasing above a threshold filter pressure drop.

Passive regeneration may occur when an engine load exceeds a threshold load causing an exhaust temperature to rise. As the exhaust temperature increases beyond a threshold temperature (e.g., 450° C.), the soot on the particulate filter 72 may combust. Therefore, passive regeneration occurs without alterations to engine operations. Conversely, active regeneration occurs via the controller 12 signaling to alterations to engine operations in order to increase exhaust temperatures (e.g., late injection, secondary injection, throttling, exhaust recirculation, spark retard, and/or a decrease in air/fuel ratio) independent of the engine load. For example, the controller may send signals to a fuel injector to decrease the pulse-width of the fuel injection, and lean the combustion air-fuel ratio (relative to stoichiometry). As another example, the controller may send signals to an electromechanical actuator coupled to the intake throttle to move the throttle valve towards a more open position, thereby increasing airflow to the engine. In still other examples, valve timing may be adjusted (e.g., via cam adjustments) to increase positive valve overlap. Further still, the controller may position exhaust diverter valve to direct exhaust gas to the exhaust bypass passage 82 and the exhaust particulate filter 72 during deceleration fuel shut-off (DFSO) or other engine shutdown events to actively regenerate the exhaust particulate filter 72. Further still, the controller 12 may preheat the exhaust particulate filter 72 to a threshold particulate filter temperature using an exhaust particulate filter heater 78 thermally coupled to the exhaust particulate filter prior to active regeneration. When the exhaust particulate filter is clogged the controller may send a message to the vehicle operator indicating regeneration of the exhaust particulate filter is to be conducted. As described above, active regeneration may include retarding the engine spark timing to increase engine air flow and subsequently increase exhaust particulate filter temperature.

As the soot burns during either passive or active regeneration, the particulate filter temperature increases to a higher temperature (e.g., 1400° C.). Extended engine operation at the elevated regeneration temperature may expedite degradation of the particulate filter 72. Degradation may include the particulate filter 72 developing a leak (e.g., crack) and/or a hole, which may cause soot to escape from the filter, and flow further downstream into the exhaust passage 48, increasing vehicle emissions. As such, this can cause an engine to be emissions non-compliant.

Other factors contributing to particulate filter degradation include vehicle vibrations and lubricating oil ash. Vehicle vibrations may degrade fragile components within the particulate filter 72 due to expansion of the components (e.g., decreased stability) caused by exposure of the particulate filter 72 to high temperatures. Lubricating oil ash may contain metal oxides which can react with the particulate filter 72 and form phases (e.g., portions of the particulate filter degrade while other portions remain functional), ultimately degrading at least a portion of the particulate filter.

The controller 12 is shown in FIG. 1 as a microcomputer, including a microprocessor unit 102, input/output ports 104, an electronic storage medium for executable programs and calibration values shown as read only memory chip 106 (e.g., non-transitory memory) in this particular example, random access memory 108, keep alive memory 110, and a data bus. The controller 12 may receive various signals from sensors coupled to the engine 10, in addition to those signals previously discussed, including measurement of inducted mass air flow (MAF) from the mass air flow sensor 120; engine coolant temperature (ECT) from a temperature sensor 112 coupled to a cooling sleeve 114; an engine position signal from a Hall effect sensor 118 (or other type) sensing a position of crankshaft 40; throttle position from a throttle position sensor 65; and manifold absolute pressure (MAP) signal from the sensor 122. An engine speed signal may be generated by the controller 12 from crankshaft position sensor 118. Manifold pressure signal also provides an indication of vacuum, or pressure, in the intake manifold 44. Note that various combinations of the above sensors may be used, such as a MAF sensor without a MAP sensor, or vice versa. During engine operation, engine torque may be inferred from the output of MAP sensor 122 and engine speed. Further, this sensor, along with the detected engine speed, may be a basis for estimating charge (including air) inducted into the cylinder. In one example, the crankshaft position sensor 118, which is also used as an engine speed sensor, may produce a predetermined number of equally spaced pulses every revolution of the crankshaft.

The storage medium read-only memory 106 can be programmed with computer readable data representing non-transitory instructions executable by the processor 102 for performing the methods described below as well as other variants that are anticipated but not specifically listed.

The controller 12 receives signals from the various sensors of FIG. 1 and employs the various actuators of FIG. 1 to adjust engine operation based on the received signals and instructions stored on a memory of the controller 12. As described above, the controller may employ actuators such as the exhaust particulate filter heater 78 and the exhaust diverter valve 80 based on received signals from one or more pressure sensors 74, temperature sensors 76, and other engine system sensors. For example, the controller may also actuate the exhaust particulate filter heater 78 and the exhaust diverter valve based on signals received from an engine temperature sensor (such as ECT sensor 112), and one or more fuel pumps, such as the fuel pump flow rate or the fuel injection flow rate.

Figure 2:
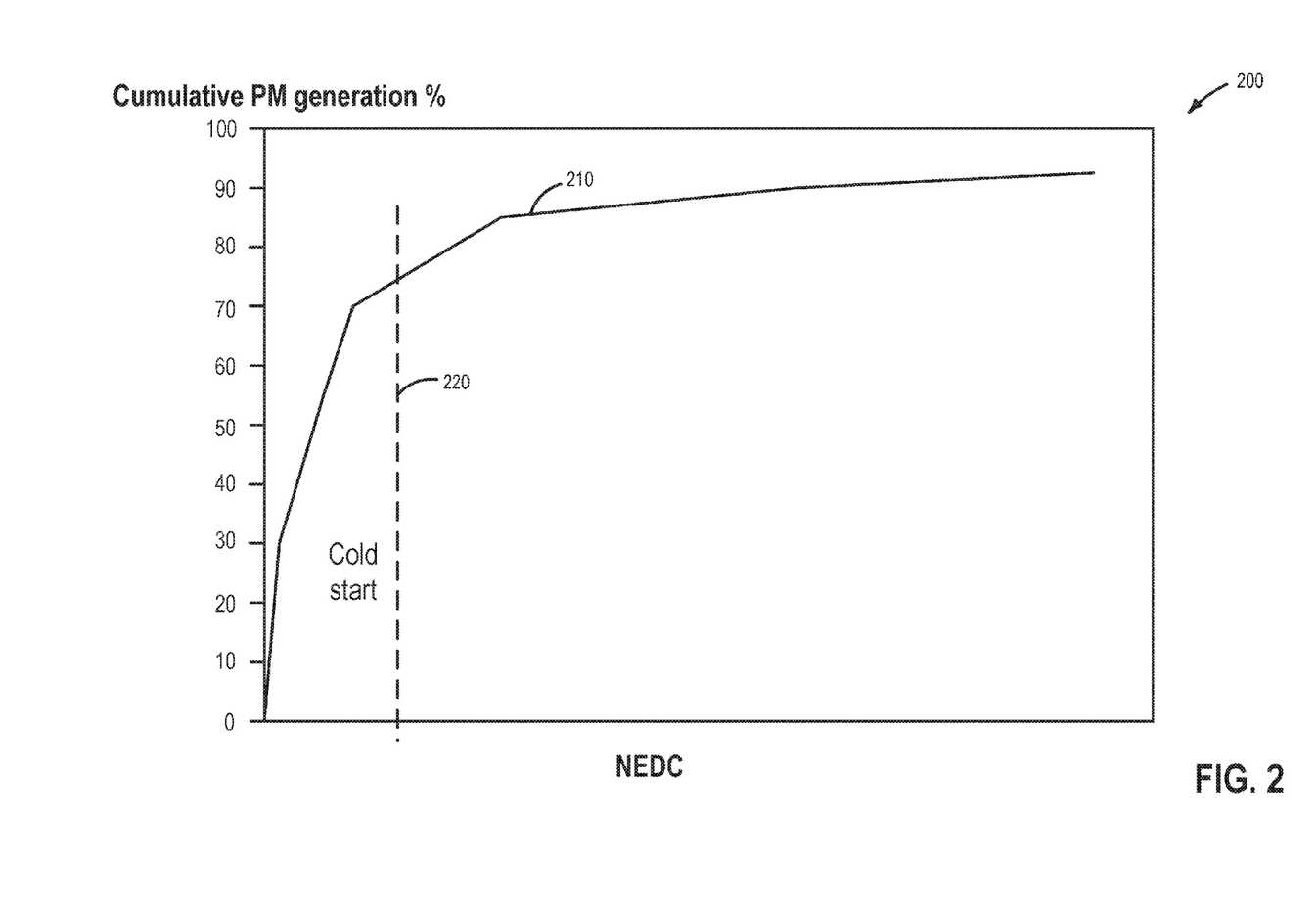
FIG. 2 shows a plot of cumulative particulate matter generation from a vehicle testing under a New European Driving Cycle (NEDC).

Turning now to FIG. 2, it illustrates an example plot 200 showing cumulative PM generation from a combustion engine resulting from a new European driving cycle (NEDC) test. Plot 200 illustrates that a major fraction of the overall PM generation occurs during the cold start period indicated prior to dashed boundary line 220. During the cold start period, when the engine temperature is low (e.g., cold), fuel combustion quality in a combustion engine may be low or incomplete, giving rise to a higher level of PM. As such, diverting exhaust gases to an exhaust particulate filter to capture PM generated during cold start conditions may significantly reduce engine PM emissions.

Turning now to FIG. 3, it illustrates an example engine exhaust system 300 of the engine system 100 shown in FIG. 1. Exhaust from the engine flows from main exhaust passage 48 through ECD 70 to exhaust passage 348 immediately upstream from exhaust bypass passage 82. As shown in FIG. 3, controller 12 may position exhaust diverter valve 80 to divert exhaust gas from the exhaust passage 348 to the exhaust bypass passage 82 where it may be filtered by the exhaust particulate filter 72. Alternately, controller 12 may move exhaust diverter valve 80 in the direction of arrow 380 so that the exhaust gas in exhaust passage 348 bypasses the exhaust particulate filter 72 and continues along exhaust passage 348 to the tail pipe. As described above, a check valve may be positioned in the portion of the exhaust bypass passage 382 downstream from the exhaust particulate filter 72 in order to prevent backflow of exhaust gases from the exhaust passage 348 to the exhaust bypass passage 382. In some examples, the exhaust bypass passage 82 (including 382) may be smaller than the main exhaust passage 48, whereby a cross-sectional area or diameter of the exhaust bypass passage 82 is less than a cross-sectional area or diameter of the main exhaust passage 48. Controller 12 may also actuate exhaust particulate filter heater 78, which is thermally coupled to the exhaust particulate filter 72, to raise the temperature of the exhaust particulate filter above a threshold filter temperature prior to regeneration of the exhaust particulate filter 72. Exhaust particulate filter heater may include an electrically powered coiled element heater that is partially or entirely wrapped around the external surface of the body of the exhaust particulate filter 72, or other types of heaters.

During cold start conditions, the exhaust diverter valve 80 may be positioned to divert exhaust gases from the main exhaust passage 48 to exhaust bypass passage 82 and the exhaust particulate filter 72. In this way, a substantial portion of the particulate matter generated from fuel combustion in the engine may be filtered by the exhaust particulate filter 72, thereby maintaining or reducing PM emissions. Cold start conditions may include the engine status being ON, and the engine temperature, such as the ECT measured by temperature sensor 112 being less than a threshold engine temperature. The threshold engine temperature may correspond to a temperature above which PM generated by combustion of fuel in the engine is significantly reduced or near zero. As other examples, the engine temperature may correspond to an engine oil temperature, an engine block temperature, an engine exhaust temperature, and the like. Furthermore, the cold start condition may alternatively comprise a plurality of such engine temperatures being less than a plurality of corresponding threshold engine temperatures. Additionally, the cold start condition may include a duration after an engine status is switched from OFF to ON when the engine temperature is less than the threshold engine temperature being greater than a threshold duration.

During warm engine conditions, including when an engine temperature, such as the ECT measured by temperature sensor 112, is greater than the threshold engine temperature, the exhaust diverter valve 80 may be positioned indicated by arrow 380 so that exhaust gas bypasses the exhaust particulate filter 72 during engine combustion conditions. The engine temperature may include a cylinder head temperature (CHT) and the threshold engine temperature may include a threshold CHT. In other examples, warm engine conditions (or departure from cold start conditions) may be determined by an elapsed engine ON duration from an engine start increasing above a threshold duration. Warm engine conditions may further be determined via an inferred piston temperature model on-board the controller. In other examples warm engine conditions may be determined by transition from a first fuel injection mode to a second fuel injection mode in a split mode fuel injection engine operation. In yet another example, warm engine conditions may be determined by an emissions control device (ECD) catalyst heating mode. For example, during cold start conditions, the ECD catalyst may be rapidly heated in order to reduce engine emissions. Conversely, during warm engine conditions, the rapid heating of the ECD catalyst may be switched off. Thus the warm engine conditions may be indicated by the ECD catalyst heating mode being switched off. Engine combustion conditions may be determined by a fuel injection flow rate to the engine being greater than a threshold fuel injection flow rate. As described above, the fuel injection flow rate may be estimated or determined from a pump rate of one or more fuel pumps in the engine fuel system. Alternately, engine combustion conditions may be determined by the delivery of a spark to combustion chamber 30 via spark plug 66 while the fuel injection flow rate is greater than a threshold fuel injection flow rate. In one example, delivery of a spark to the combustion chamber 30 may be indicated by the supply of power to the ignition system comprising an ignition coil (not shown) for increasing voltage supplied to spark plug 66. Thus, engine combustion conditions may be indicated if a voltage supplied to spark plug 66 is greater than a threshold voltage and the fuel injection flow rate is greater than the threshold fuel injection flow rate. In another example, engine combustion may be detected via crankshaft acceleration increasing above a threshold crankshaft acceleration. The crankshaft acceleration may be measured via a crankshaft position (CKP) sensor such as Hall effect position sensor 118, and the threshold crankshaft acceleration may correspond to a crankshaft acceleration above which combustion in the engine is indicated.

When fuel combustion occurs during warm engine conditions, the amount of PM generated by the engine may be very low as compared to PM generated during cold start conditions. Accordingly, in response to the engine temperature increasing above a threshold engine temperature and in response to indication of fuel combustion conditions, the exhaust diverter valve may be positioned to direct exhaust gas to bypass the exhaust particulate filter 72, while maintaining PM emissions. Accordingly, combusted exhaust gas (e.g., engine exhaust gas resulting from fuel combustion in the engine) may only be directed to the exhaust bypass passage and the exhaust particulate filter 72 during cold start conditions. During warm engine conditions, when an engine temperature is greater than a threshold engine temperature, the exhaust diverter valve may be positioned to direct the combusted exhaust gas to bypass the exhaust particulate filter 72 positioned in the exhaust bypass passage 82. Accordingly, during engine combustion events outside of the cold start conditions, engine exhaust (combusted exhaust) may be directed to bypass the exhaust particulate filter 72. Furthermore, in some examples, the engine exhaust system may further comprise a second exhaust particulate filter positioned at ECD 70, to capture the auxiliary PM generated during fuel combustion under warm engine conditions.

Although the exhaust diverter valve 80 may be positioned to direct exhaust gas to bypass the exhaust particulate filter 72, controller 12 may switch on exhaust particulate filter heater 78 to heat the exhaust particulate filter 72 during warm engine conditions and fuel combustion conditions. The exhaust particulate filter heater 78 may comprise an electrically powered or other type of heater thermally coupled to the exhaust particulate filter 72. In the example exhaust system 400 of FIG. 4, heating the exhaust particulate filter 72 may comprise positioning the exhaust particulate filter 72 directly adjacent to ECD 70 such that exhaust particulate filter 72 is thermally coupled to ECD 70 via thermally conductive surface 472. Heating the exhaust particulate filter 72 during warm engine and fuel combustion conditions may allow for preheating of the exhaust particulate filter 72 to a threshold filter temperature prior to regeneration. Preheating the exhaust particulate filter 72 to the threshold filter temperature may help to ensure that the exhaust particulate filter 72 can be promptly regenerated when the exhaust particulate filter becomes clogged, for example, when an exhaust particulate filter pressure across the filter is greater than a threshold filter pressure drop. In one example, the threshold filter temperature may be approximately 500° C. (e.g., above the threshold temperature of 450° C., at which soot combusts). For example, when the exhaust particulate filter is above the threshold filter temperature, directing exhaust oxygen to the exhaust particulate filter may oxidize and combust the soot particles contained therein, thereby regenerating the exhaust particulate filter. If the exhaust particulate filter temperature is below the threshold filter temperature, the thermal energy contained in the exhaust particulate filter may be insufficient to fully or partially regenerate the exhaust particulate filter 72 when exhaust oxygen is directed to the filter. In response to the exhaust particulate filter temperature increasing above the threshold filter temperature, the controller 12 may switch the exhaust particulate filter heater 78 OFF. Accordingly, during engine combustion events outside of the cold start conditions, engine exhaust (combusted exhaust) may be directed to bypass the exhaust particulate filter 72 and the exhaust particulate filter 72 may be selectively electrically heated via the exhaust particulate filter heater 78. Furthermore, when the exhaust particulate filter temperature is heated above the threshold filter temperature, uncombusted exhaust gas (engine exhaust during engine shutdown conditions such as DFSO conditions) may be directed to the exhaust bypass passage 82 to regenerate the exhaust particulate filter 72.

The controller 12 may initiate regeneration of the exhaust particulate filter 72 during warm engine conditions outside of fuel combustion conditions. Warm engine conditions outside of fuel combustion conditions may occur when the engine is switched OFF after being on for a duration. For example, the engine may be switched OFF during DFSO events or for a hybrid vehicle when operating in electric-only mode (e.g., the hybrid vehicle is propelled by the electric motor but not by the engine). Furthermore, controller 12 may initiate regeneration of the exhaust particulate filter during warm engine conditions outside of fuel combustion conditions when the exhaust particulate filter temperature is greater than a threshold filter temperature. Further still, the controller 12 may initiate regeneration of the exhaust particulate filter during warm engine conditions outside of fuel combustion conditions when the exhaust particulate filter temperature is greater than the threshold filter temperature and when the exhaust particulate filter pressure drop is greater than a threshold filter pressure drop. Initiating regeneration of the exhaust particulate filter may comprise positioning the exhaust diverter valve 80 to direct exhaust to flow to the exhaust bypass passage 82 and the exhaust particulate filter 72. During warm engine conditions outside of fuel combustion conditions (e.g., engine OFF conditions, DFSO conditions), fuel is not combusted inside the engine and the exhaust gas may largely contain air, including oxygen. As described above, when the exhaust particulate filter temperature is above the threshold filter temperature, flowing exhaust oxygen through the filter may oxidize and combust soot PM contained therein, thereby regenerating the exhaust particulate filter.

During filter regeneration, the pressure drop across the exhaust particulate filter 72 may decrease as soot PM contained therein are oxidized and combusted. As described above, filter regeneration may be initiated at least partially in response to engine operating conditions including the pressure drop across the exhaust particulate filter increasing above a threshold pressure drop. Accordingly, in response to the pressure drop across the exhaust particulate filter decreasing below the threshold pressure drop, filter regeneration may be stopped by the controller 12. Terminating filter regeneration may include positioning the exhaust diverter valve to direct exhaust gas to bypass the exhaust particulate filter. As described above, filter regeneration occurs during warm engine conditions outside of fuel combustion in the engine. Consequently, directing exhaust gas to bypass the exhaust particulate filter and to pass through the exhaust passage 48, ECD 70, and exhaust passage 348 to the tailpipe may not substantially increase PM emissions. Furthermore, should the engine temperature decrease below the threshold engine temperature after terminating the filter regeneration, the controller 12, in response, may reposition the exhaust diverter valve 80 to direct exhaust gas to flow through the exhaust bypass passage 82 and the exhaust particulate filter 72, thereby reducing PM emissions.

As described above, being positioned in the exhaust bypass passage 82 allows for the exhaust particulate filter 72 to be used to filter PM in the exhaust gas selectively during cold start conditions. As such, the sizing of the exhaust particulate filter 72 may be smaller than conventional exhaust particulate filters. Conventional exhaust particulate filters, such as DPFs and GPFs that are positioned in the main exhaust passage, filter all the exhaust gas from the engine. Conventional exhaust particulate filters are exposed to other types of particles other than soot PM, including larger inert particles such as rust, upstream catalyst fragment particles, metal particles, and the like. These larger inert particles may not be oxidized or combusted during filter regeneration and thus can steadily accumulate in and degrade particulate filters. By positioning the exhaust particulate filter 72 in the bypass exhaust passage, and by selectively flowing exhaust gas to the exhaust particulate filter 72 during cold start conditions and for filter regeneration, as described above, the amount of larger inert particles encountering the exhaust particulate filter 72 may be substantially reduced. Accordingly, the sizing of the exhaust particulate filter can be smaller, and the frequency and effectiveness of regenerations thereof can be higher, thus decreasing vehicle manufacturing and operating costs and increasing vehicle reliability.

The power of the exhaust particulate filter heater 78 may be substantially less than a conventional electrical heater employed for electrically heating conventional emission control devices such as a TWC for hydrocarbon reduction. For example, whereas conventional heaters typically consume greater than 2.2 kW of power, the exhaust particulate filter heater 78 may consume a much smaller amount of power, for example, 75 W. The exhaust particulate filter heater 78 may be dedicated for heating the exhaust particulate filter 72 and so may be smaller in size and may consume less power than conventional ECD heaters, which may be used for heating catalyst bricks integrated with other additional ECD devices such as particulate filters, housings, and the like. Furthermore, as described above, the exhaust particulate filter 72 is positioned in the exhaust bypass passage 82, and may be sized substantially smaller than conventional particulate filters that are positioned in the main exhaust passage 48 (which is larger in cross-sectional area than the exhaust bypass passage 82). Furthermore, the exhaust particulate filter heater 78 may be smaller than conventional ECD heaters because the exhaust particulate filter 72 is positioned in the exhaust bypass passage 82 and may be bypassed during engine operating conditions where PM is lower; in other words, the filter load, and consequently the regeneration frequency, of the exhaust particulate filter may be reduced. In one example, the exhaust particulate filter may comprise a mini-particulate filter, having approximate dimensions of the exhaust particulate filter 72 may comprise a diameter<30 mm, a length<205 mm, a cross sectional area<1 square inch, and a ceramic volume of <50000 mm$^3$. Furthermore, the mass of ceramic material contained within the filter may be <65 g. The exhaust particulate filter size may vary according to engine displacement, soot output, and maximum soot load threshold. Further still, the exhaust particulate filter 72 may comprise a thermally insulated filter so that thermal energy losses from the exhaust particulate filter 72 are reduced, and so that the power consumed to heat the exhaust particulate filter 72 is reduced. Thermally insulating the exhaust particulate filter 72 may comprise thermally insulating external surfaces of the exhaust particulate filter 72 with an insulating, non-flammable material.

Turning now to FIG. 4, it illustrates another example configuration of an exhaust system 400 of engine system 100. Exhaust system 400 may be operated as part of engine system 100 similarly to exhaust system 300 as described above with reference to FIG. 3. However, in the exhaust system 400, exhaust bypass passage 82 and exhaust particulate filter 72 are arranged such that the exhaust particulate filter 72 is thermally coupled to the ECD 70 via at least one common thermally conductive surface 472. In this way, thermal energy from ECD 70 may be conducted or transferred via thermally conductive surface 472 to heat exhaust particulate filter 72, thus further lowering the amount heating power output from exhaust particulate filter heater 78 for raising the temperature of the exhaust particulate filter 72 to a threshold filter temperature prior to filter regeneration. ECD 70 may be heated at least partially from the hot engine exhaust gases passing therethrough. Furthermore, an ECD heater may be employed and controlled by controller 12 to heat ECD 70. In the case where the exhaust bypass passage 82 and exhaust particulate filter 72 are arranged such that the exhaust particulate filter 72 is thermally coupled to the ECD 70 via at least one common thermally conductive surface 472, all external surfaces of the exhaust particulate filter 72 may be thermally insulated except for the common thermally conductive surface 472.

Positioning the exhaust particulate filter 72 downstream from ECD 70 (including a catalyst such as a TWC, NOx reduction catalyst, and the like) may further be used to increase backpressure in the main exhaust passage 48 for increasing ECD temperatures during cold start conditions, even though PM levels in the exhaust may be low during cold start conditions. In this way, power consumed to heat the catalyst may be reduced and the catalyst may be pre-heated more rapidly, thereby increasing fuel economy and reducing exhaust emissions.

In this manner, an engine system may comprise: an engine; an exhaust particulate filter positioned in an exhaust bypass passage downstream of the engine; an exhaust diverter valve positioned an exhaust diverter valve positioned in an exhaust main passage upstream of the exhaust bypass passage upstream of the exhaust bypass passage; and a controller, including executable instructions to, during a first condition comprising an engine temperature being less than a threshold engine temperature, positioning the exhaust diverter valve to direct engine exhaust gas from the exhaust main passage to the exhaust bypass passage and the exhaust particulate filter; and during a second condition, positioning the exhaust diverter valve to direct engine exhaust gas to bypass the exhaust bypass passage, wherein the second condition comprises the engine temperature being greater than or equal to the threshold engine temperature and fuel being combusted in the engine. Additionally or alternatively, the engine system may further comprise an exhaust particulate filter heater, wherein the executable instructions further comprise heating the exhaust particulate filter to a regeneration temperature with the exhaust particulate filter heater during the second condition. Additionally or alternatively, the exhaust particulate filter heater comprises an electrical heating element thermally coupled to the exhaust particulate filter. Additionally or alternatively, the exhaust particulate filter heater may comprise an emission control device upstream of the exhaust particulate filter and thermally coupled to the exhaust particulate filter, and heating the exhaust particulate filter may comprise during the second condition, transferring thermal energy from the emission control device to the exhaust particulate filter. Additionally or alternatively, the executable instructions may further comprise during a third condition, positioning the exhaust diverter valve to direct engine exhaust gas to the exhaust bypass passage and the exhaust particulate filter, wherein the third condition comprises a fuel injection flow rate being less than a threshold flow while the engine temperature is greater than the threshold engine temperature. Additionally or alternatively, the third condition may further comprise the exhaust particulate filter temperature being greater than the regeneration temperature. Additionally or alternatively, the third condition may further comprise an exhaust particulate filter pressure drop being greater than a threshold pressure drop. Additionally or alternatively, the executable instructions may further comprise, during the third condition, in response to the exhaust particulate filter pressure drop decreasing below the threshold pressure drop, positioning the exhaust diverter valve to direct engine exhaust to bypass the exhaust bypass passage. Additionally or alternatively, the executable instructions may further comprise, during the third condition, in response to the exhaust particulate filter temperature decreasing below the regeneration temperature, positioning the exhaust diverter valve to direct engine exhaust to bypass the exhaust bypass passage. Additionally or alternatively, a cross-sectional area of the exhaust bypass passage is smaller than a cross-sectional area of the exhaust main passage.

Turning now to FIG. 5, it illustrates a flow chart for an example method 500 of operating an engine system, including an exhaust diverter valve and an exhaust particulate filter positioned in an exhaust bypass passage and thermally coupled to an exhaust particulate filter heater. Method 500 may be executed as executable instructions on board a vehicle controller, such as controller 12. Method 500 begins at 502 where engine system conditions such as vehicle speed (Vs), engine rpm, engine coolant temperature (ECT), fuel injection flow rate ($Q_{inj}$), and the like, are estimated and/or measured by the controller.

At 510, the controller may determine if engine cold start conditions have been met. Engine cold start conditions may include an engine temperature, $T_{engine}$, being less than a threshold engine temperature, $T_{engine,TH}$. As described above, $T_{engine}$ may comprise ECT, engine oil temperature, engine block temperature, engine exhaust temperature, or another temperature indicative of the engine operating temperature, or a combination thereof. $T_{engine,TH}$ may represent a temperature below which combustion of fuel in the engine is more incomplete or of poorer quality such that a substantially higher amount of PM is emitted in the engine exhaust. Conversely, when $T_{engine} > T_{engine,TH}$, combustion of fuel in the engine is more complete or of higher quality such that a substantially lower amount of PM is emitted in the engine exhaust.

If the cold start conditions are met, method 500 proceeds to 514 where the controller may position the exhaust diverter valve 80 to divert exhaust gas to the exhaust particulate filter 72 via exhaust bypass passage 82. By directing exhaust gas to the exhaust particulate filter 72, PM generated by fuel combustion during cold start conditions may be filtered from the exhaust gas and PM emissions may be reduced. At 518, controller 12 may turn off the exhaust particulate filter heater 78 to stop heating of the exhaust particulate filter 72. After 518, method 500 ends.

Returning to 510, if the cold start conditions are not met, method 500 continues at 520 where controller 12 may determine if the engine is operating outside of fuel combustion conditions. As described above, the engine may be operating outside of fuel combustion conditions if the fuel injection flow rate, $Q_{inj}$, is less than a threshold fuel injection flow rate, $Q_{inj,TH}$. Fuel injection flow rate may be estimated or measured by a fuel pump flow rate of one or more fuel pumps of the engine fuel system. Alternately, the engine may be operating outside of fuel combustion conditions if a voltage supplied to a spark plug of an engine cylinder is less than a threshold voltage while the fuel injection flow rate directed to that engine cylinder is greater than the threshold fuel injection flow rate. The threshold voltage may correspond to a voltage below which a spark is not generated at the spark plug of the engine cylinder. In one example, $Q_{inj,TH}$ may be zero. In another example, engine combustion conditions may be detected via crankshaft acceleration increasing above a threshold crankshaft acceleration. The crankshaft acceleration may be measured via a crankshaft position (CKP) sensor such as Hall effect position sensor 118. Thus, if the crankshaft acceleration is below the threshold crankshaft acceleration, the engine may be determined to be operating outside of engine combustion conditions. If the engine is operating outside of fuel combustion conditions, such as when the engine is off during engine shutdown events such as during DFSO, there may be an opportunity for regenerating the exhaust particulate filter since the exhaust gas comprises substantially air or oxygen. In some examples, the exhaust particulate filter may be regenerated during lean air-fuel engine operating conditions. Other examples of engine operation outside of fuel combustion conditions include during extended engine crank start-up and during shutdown of the engine.

If the engine is operating outside of fuel combustion conditions at 520, method 500 continues at 522 where the controller 12 may determine if the exhaust particulate filter temperature, $T_{PF}$ is greater than a threshold filter temperature, $T_{PF,TH}$. As described previously, $T_{PF,TH}$ may correspond to a filter temperature above which flowing exhaust oxygen through the exhaust particulate filter may initiate combustion of soot PM contained therein, thereby regenerating the filter. As an example $T_{PF,TH}$ may be greater than 450° C., or $T_{PF,TH}$ may include 500° C. When $T_{PF} > T_{PF,TH}$, the exhaust particulate filter may be preheated and ready for filter regeneration, and the controller 12 may turn off the exhaust particulate filter heater 78 at 524 to stop heating the exhaust particulate filter 72. Next, method 500 continues at 526 where the controller 12 may determine if the exhaust particulate filter pressure drop, $\Delta P_{PF}$, is greater than a threshold exhaust particulate filter pressure drop, $\Delta P_{PF,TH}$. $\Delta P_{PF,TH}$ may correspond to a pressure drop above which the exhaust particulate filter may contain a substantial level of PM therein such that $\Delta P_{PF}$ may prevent proper exhaust expulsion and reduce engine operability. If $\Delta P_{PF} > \Delta P_{PF,TH}$, method 500 continues at 528 where the controller 12 may position exhaust diverter valve to direct exhaust gas to the exhaust bypass passage 82 to initiate regeneration of the exhaust particulate filter 72. After 528, method 500 ends.

Returning to 520 for the case where the engine is operating within fuel combustion conditions, method 500 continues at 530 where controller 12 may determine if $T_{PF} < T_{PF,TH}$. If $T_{PF} < T_{PF,TH}$ at either 530 or 522, method 500 continues at 534 where the controller 12 switches the exhaust particulate filter heater 78 ON to start heating the exhaust particulate filter. In this way, the exhaust particulate filter 72 may be preheated during engine combustion conditions when the engine is warm and PM generation is low. As such, the exhaust particulate filter 72 may be prepared (e.g., preheated) for regeneration, even during short periods of engine ON operation. Next, method 500 continues from 534 or from 526 if $\Delta P_{PF} < \Delta P_{PF,TH}$ at 536 where controller 12 may position the exhaust diverter valve 80 to divert exhaust gas to bypass the exhaust particulate filter 72. During fuel combustion and warm engine conditions, PM generation in the engine is reduced and the exhaust gas may bypass the exhaust particulate filter while the filter is preheated for regeneration. Furthermore, outside of fuel combustion conditions when $\Delta P_{PF} < \Delta P_{PF,TH}$, the exhaust particulate filter is in a regenerated state and exhaust gas may be directed to bypass the exhaust particulate filter.

Returning to 530 for the case where $T_{PF} > T_{PF,TH}$, method 500 continues at 538 where the controller 12 switches the exhaust particulate filter heater OFF to stop heating the exhaust particulate filter 72. When $T_{PF} > T_{PF,TH}$, the exhaust particulate filter 72 is preheated and ready for regeneration; further heating of the exhaust particulate filter 72 may reduce fuel economy unnecessarily. After 538, method 500 continues at 536 where the exhaust diverter valve is positioned to direct exhaust gas to bypass the exhaust particulate filter. After 536 method 500 ends.

In this manner, a method for an engine may comprise: during a cold start condition comprising an engine temperature being less than a threshold engine temperature, directing engine exhaust gas to an exhaust particulate filter; and during a warm engine condition, directing engine exhaust gas to bypass the exhaust particulate filter, wherein the warm engine condition comprises the engine temperature being greater than or equal to the threshold engine temperature and fuel being combusted in the engine. Additionally or alternatively, the method may further comprise directing combusted exhaust gas to the exhaust particulate filter only during the cold start condition. Additionally or alternatively, the method may further comprise heating the exhaust particulate filter during the warm engine condition. Additionally or alternatively, the method may further comprise stopping heating of the exhaust particulate filter during the cold start condition. Additionally or alternatively, the method may further comprise directing engine exhaust gas to the exhaust particulate filter during a regeneration condition, wherein the regeneration condition comprises the engine temperature being greater than or equal to the threshold engine temperature and a fuel injection flow rate being less than a threshold injection flow rate. Additionally or alternatively, the method may further comprise directing engine exhaust gas to bypass the exhaust particulate filter during the regeneration condition in response to an exhaust particulate filter pressure drop being less than a threshold pressure drop. Additionally or alternatively, the method may further comprise stopping heating of the exhaust particulate filter during the regeneration condition. Additionally or alternatively, the method may further comprise stopping heating of the exhaust particulate filter in response to an exhaust particulate filter temperature being greater than a threshold filter temperature. Additionally or alternatively, the method may further comprise thermally insulating the exhaust particulate filter.

In this manner, a method may comprise: in response to an engine temperature being greater than a threshold engine temperature, directing exhaust gas to bypass an exhaust particulate filter during engine fuel combustion, and heating the exhaust particulate filter when an exhaust particulate filter temperature decreases below a threshold filter temperature; and in response to an engine temperature being less than a threshold engine temperature, directing exhaust gas to the exhaust particulate filter and stopping the heating of the exhaust particulate filter. Additionally or alternatively, the method may further comprise in response to the engine temperature being greater than the threshold engine temperature, directing exhaust gas to the exhaust particulate filter during deceleration fuel shut-off (DFSO). Additionally or alternatively, the method may further comprise in response to the engine temperature being greater than the threshold engine temperature and an exhaust particulate filter pressure drop being less than a threshold pressure drop, directing exhaust gas to bypass the exhaust particulate filter during DFSO. Additionally or alternatively, the method may further comprise, in response to the exhaust particulate filter temperature increasing above the threshold filter temperature via the heating, directing uncombusted exhaust gas to regenerate the exhaust particulate filter Turning now to FIG. 6, it illustrates a timeline 600 depicting operation of an exhaust system including an exhaust diverter valve 80 and an exhaust particulate filter 72 and exhaust particulate filter heater 78 positioned in an exhaust bypass passage 82. Timeline 600 includes trend lines for engine status 604, engine temperature, $T_{engine}$ 610, fuel injection flow rate, $Q_{inj}$ 620, exhaust particulate filter temperature, $T_{PF}$ 630, exhaust particulate filter pressure drop, $\Delta P_{PF}$ 640, exhaust diverter valve position 650, exhaust particulate filter heater status 660, and exhaust particulate filter regeneration status 670. Also shown in timeline 600 are threshold engine temperature, $T_{engine,TH}$ 612, threshold fuel injection flow rate, $Q_{inj,TH}$ 622, threshold filter temperature, $T_{PF,TH}$ 632, threshold filter pressure drop, and $\Delta P_{PF,TH}$ 642.

At time<time t1, the engine is OFF, $T_{engine}$ is low (e.g., less than $T_{engine,TH}$), $Q_{inj}$ is low (less than $Q_{inj,TH}$), $T_{PF}$< $T_{PH,TH}$, the exhaust diverter valve is positioned to bypass the exhaust particulate filter, the exhaust particulate filter heater is OFF, and the exhaust particulate filter regeneration status is OFF. $\Delta P_{PF}$ is at a moderate level greater $\Delta P_{PF,TH}$, perhaps due to prior vehicle operation when the exhaust particulate filter was partially clogged with PM from cold start engine operation. At time t1, the engine is turned ON, $Q_{inj}$ increases above $Q_{inj,TH}$ and the engine temperature begins to rise, indicating fuel combustion in the engine. In response to the engine being ON and $T_{engine}$<$T_{engine,TH}$ (e.g., cold start conditions), the controller 12 positions the exhaust diverter valve to divert exhaust gas to the exhaust particulate filter so that PM generated by combustion in the cold engine can be filtered from the exhaust passage and PM emissions can be reduced. Consequently, after time t1, $\Delta P_{PF}$ begins to increase as PM is trapped within the exhaust particulate filter. As $T_{engine}$ increases, the rate of PM generated from fuel combustion may decrease, however, the rate of increase of $\Delta P_{PF}$ may increase in response to the higher levels of PM contained in the exhaust particulate filter.

At time t2, $T_{engine}$ increases above $T_{engine,TH}$, indicating warm engine conditions. In response, the controller 12 may position the exhaust diverter valve to direct the exhaust gas to bypass the exhaust particulate filter since PM generation rates from engine combustion during warm engine conditions may be very low as compared to cold start engine conditions when $T_{engine}$<$T_{engine,TH}$. Thus, at time t2, $\Delta P_{PF}$ ceases to increase since no further PM is being filtered from the exhaust gas by the exhaust particulate filter 72. In response to $T_{engine}$>$T_{engine,TH}$ and in response to $Q_{inj}$>$Q_{inj,TH}$ (warm engine conditions and fuel combustion conditions), controller 12 switches the exhaust particulate filter heater ON to begin preheating the exhaust particulate filter to prepare for filter regeneration. As shown at time t2, $T_{PF}$ begins to increase responsive to the heater status 660 being switched ON.

At time t3, $Q_{inj}$ decreases below $Q_{inj,TH}$, indicating a DFSO or other engine shutdown event outside of engine fuel combustion conditions. Because $T_{PF}$<$T_{PF,TH}$ between time t3 and time t4, the exhaust particulate filter temperature is not high enough for filter regeneration and controller 12 maintains the exhaust diverter valve positioned so that exhaust gas bypasses the exhaust particulate filter, and the PF regeneration status remains OFF. At time t4, $T_{PF}$ increases above $T_{PF,TH}$, indicating that the exhaust particulate filter is preheated and ready for filter regeneration. In response to $T_{PF}$ increasing above $T_{PF,TH}$, the controller switches the exhaust particulate filter heater off, as indicated by the heater status changing to OFF at time t4. Because $Q_{inj}$ is greater than $Q_{inj,TH}$ at time t4, the engine is operating within fuel combustion conditions and the controller 12 maintains the exhaust diverter valve positioned to bypass the exhaust particulate filter.

At time t5, $Q_{inj}$ decreases once again below $Q_{inj,TH}$ indicating a DFSO or engine shutdown event outside of engine fuel combustion conditions. In response to the DFSO event and in response to $T_{PF}$>$T_{PF,TH}$ and because $\Delta P_{PF}$>$\Delta P_{PF,TH}$ (indicating that the filter contains a substantial level PM that can be regenerated), controller 12 may position exhaust diverter valve to direct the exhaust gas to flow from the main exhaust passage to the exhaust bypass passage 82 through exhaust particulate filter 72. Because the engine is operating outside of fuel combustion conditions at time t5, the exhaust gas may be primarily air or oxygen. The exhaust oxygen flowing through the preheated exhaust particulate filter may oxidize and combust the PM contained therein, thereby regenerating the exhaust particulate filter.

Between time t5 and time t6, $T_{PF} > T_{PF,TH}$, $\Delta P_{PF} > \Delta P_{PF,TH}$, and $Q_{inj}$ increases above and decreases below $Q_{inj,TH}$ several times indicating periods of engine operation with and without (e.g., DFSO) fuel combustion. Accordingly, between times t5 and t6, responsive to when $Q_{inj}$ increases above $Q_{inj,TH}$, the controller 12 positions exhaust diverter valve to direct exhaust gas to bypass the exhaust particulate filter and the PF regeneration status is switched OFF. Conversely, between times t5 and t6, responsive to when $Q_{inj}$ decreases below $Q_{inj,TH}$, the controller 12 positions exhaust diverter valve to direct exhaust gas to flow through the exhaust particulate filter and the PF regeneration status is switched ON. When the PF regeneration status is switched ON, $\Delta P_{PF}$ decreases; when the PF regeneration status is switched OFF, $\Delta P_{PF}$ stays relatively constant since exhaust gas is bypassing the exhaust particulate filter.

At time t6, $\Delta P_{PF}$ decreases below $\Delta P_{PF,TH}$, indicating the filter regeneration is complete (e.g., PM contained in the exhaust particulate filter have been oxidized and combusted to an extent whereby the pressure drop across the filter due to PM contained therein does not adversely impact exhaust flow). In response, the controller 12 positions the exhaust diverter valve to direct exhaust gas to bypass the exhaust particulate filter and the PF regeneration status is switched OFF. Furthermore, after t6, the PF regeneration status remains off and the exhaust diverter valve remains positioned to direct exhaust gas to bypass the exhaust particulate filter even when $Q_{inj}$ decreases below $Q_{inj,TH}$ (while $T_{PF} > T_{PF,TH}$ and $T_{engine} > T_{engine,TH}$) since $\Delta P_{PH} < \Delta P_{PF,TH}$.

In this way, the exhaust particulate filter may be reliably regenerated during engine shutdown events such as DFSOs while reducing premature filter degradation. Furthermore, by avoiding any limiting of the engine shutdown events during filter regeneration, drivability and fuel economy may be maintained. Further still, by diverting the exhaust stream to the exhaust particulate filter during engine cold start conditions and bypassing the exhaust particulate filter during warm engine combustion conditions, the exhaust particulate filter size may be reduced thereby lowering manufacturing costs and improving reliability while maintaining vehicle PM emissions.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine system, comprising:
an engine;
an exhaust particulate filter positioned in an exhaust bypass passage downstream of the engine;
an exhaust diverter valve positioned in an exhaust main passage upstream of the exhaust bypass passage; and
a controller, including executable instructions to,
during a first condition comprising an engine temperature being less than a threshold engine temperature, positioning the exhaust diverter valve to direct engine exhaust gas from the exhaust main passage to the exhaust bypass passage;
during a second condition, positioning the exhaust diverter valve to direct engine exhaust gas to bypass the exhaust bypass passage, wherein the second condition comprises the engine temperature being greater than or equal to the threshold engine temperature and fuel being combusted in the engine; and
during a third condition, positioning the exhaust diverter valve to direct engine exhaust gas to the exhaust bypass passage and the exhaust particulate filter, wherein the third condition comprises a crankshaft acceleration being less than a threshold crankshaft acceleration while the engine temperature is greater than the threshold engine temperature.

2. The engine system of claim 1, further comprising an exhaust particulate filter heater, wherein the executable instructions further comprise heating the exhaust particulate filter to a regeneration temperature with the exhaust particulate filter heater during the second condition.

3. The engine system of claim 2, wherein the exhaust particulate filter heater comprises an electrical heating element thermally coupled to the exhaust particulate filter.

4. The engine system of claim 3, wherein
the exhaust particulate filter heater comprises an emission control device upstream of the exhaust particulate filter and thermally coupled to the exhaust particulate filter, and
heating the exhaust particulate filter comprises, during the second condition, transferring thermal energy from the emission control device to the exhaust particulate filter, wherein the exhaust particulate filter is regenerated without flowing engine exhaust gas therethrough.

5. The engine system of claim 1, wherein the third condition further comprises an exhaust particulate filter temperature being greater than a regeneration temperature and an exhaust particulate filter pressure drop being greater than a threshold pressure drop.

6. The engine system of claim 5, wherein the executable instructions further comprise, during the third condition, in response to the exhaust particulate filter pressure drop decreasing below the threshold pressure drop, positioning the exhaust diverter valve to direct engine exhaust gas to bypass the exhaust bypass passage.

7. The engine system of claim 6, wherein the executable instructions further comprise, during the third condition, in response to the exhaust particulate filter temperature decreasing below the regeneration temperature, positioning the exhaust diverter valve to direct engine exhaust gas to bypass the exhaust bypass passage.

8. The engine system of claim 1, wherein a cross-sectional area of the exhaust bypass passage is smaller than a cross-sectional area of the exhaust main passage.

\* \* \* \* \*